United States Patent
Liu et al.

(10) Patent No.: US 11,495,818 B2
(45) Date of Patent: Nov. 8, 2022

(54) PROTON-CONDUCTING ELECTROLYTES FOR REVERSIBLE SOLID OXIDE CELLS

(71) Applicants: Phillips 66 Company, Houston, TX (US); Georgia Tech Research Corporation, Atlanta, GA (US)

(72) Inventors: Meilin Liu, Alpharetta, GA (US); Ryan Murphy, Albany, OR (US)

(73) Assignees: Phillips 66 Company, Houston, TX (US); Georgia Tech Research Corporation, Allanta, GA (US)

(*) Notice: Subject to any disclaimer, the term of this patent is extended or adjusted under 35 U.S.C. 154(b) by 34 days.

(21) Appl. No.: 17/337,463

(22) Filed: Jun. 3, 2021

(65) Prior Publication Data
US 2022/0123341 A1    Apr. 21, 2022

Related U.S. Application Data

(60) Provisional application No. 63/042,599, filed on Jun. 23, 2020.

(51) Int. Cl.
    *H01M 8/1246* (2016.01)
    *C25B 1/04* (2021.01)
    *H01M 8/12* (2016.01)

(52) U.S. Cl.
    CPC ............ *H01M 8/1246* (2013.01); *C25B 1/04* (2013.01); *H01M 2008/1293* (2013.01)

(58) Field of Classification Search
    None
    See application file for complete search history.

(56) References Cited

U.S. PATENT DOCUMENTS

| 2011/0195342 A1* | 8/2011 | Luo ................ B01D 69/12 |
| | | 429/495 |
| 2013/0143142 A1* | 6/2013 | Liu ................ H01M 8/145 |
| | | 429/535 |
| 2021/0005916 A1 | 1/2021 | Higashino et al. |

FOREIGN PATENT DOCUMENTS

WO    WO 2019/107194    6/2019

OTHER PUBLICATIONS

International Search Report and Written Opinion from counterpart Int'l Pat. App. PCT/US2021/035570, dated Sep. 22, 2021 (5 pp.).
Murphy, R.J., "A New Family of Proton Conducting Electrolytes with Enhanced Stability for Reversible Fuel Cell Operation: $BaHf_x Ce_{0.8-x}Y_{0.1}Yb_{0.1}O_3$," Georgia Institute of Technology, Dissertation, https://smartech.gatech.edu/handle/1853/64017, date available = Jan. 11, 2021 (127 pp.).

* cited by examiner

*Primary Examiner* — Christopher P Domone
(74) *Attorney, Agent, or Firm* — FisherBroyles, LLP

(57) ABSTRACT

Disclosed herein are barium hafnate comprising proton-conducting electrolytes for use in solid oxide fuel cells. The disclosed electrolytes are also useful for electrolysis operations and for carbon dioxide tolerance.

4 Claims, 12 Drawing Sheets

PROTON-CONDUCTING ELECTROLYTES FOR REVERSIBLE SOLID OXIDE CELLS

FIELD

Disclosed herein are barium hafnate comprising proton-conducting electrolytes for use in solid oxide fuel cells. The disclosed electrolytes are also useful for electrolysis operations and for carbon dioxide tolerance.

BRIEF DESCRIPTION OF THE FIGURES

FIGS. 6A and 6B represent values obtained from first-principles calculations.

FIG. 13 H shows the long-term stability of a BHCYYb-3511 electrolysis cell compared to BZCYYb-1711 and BZCYYb-3511 cells with $CO_2$ in the fuel side.

DETAILED DESCRIPTION

Figure 1:
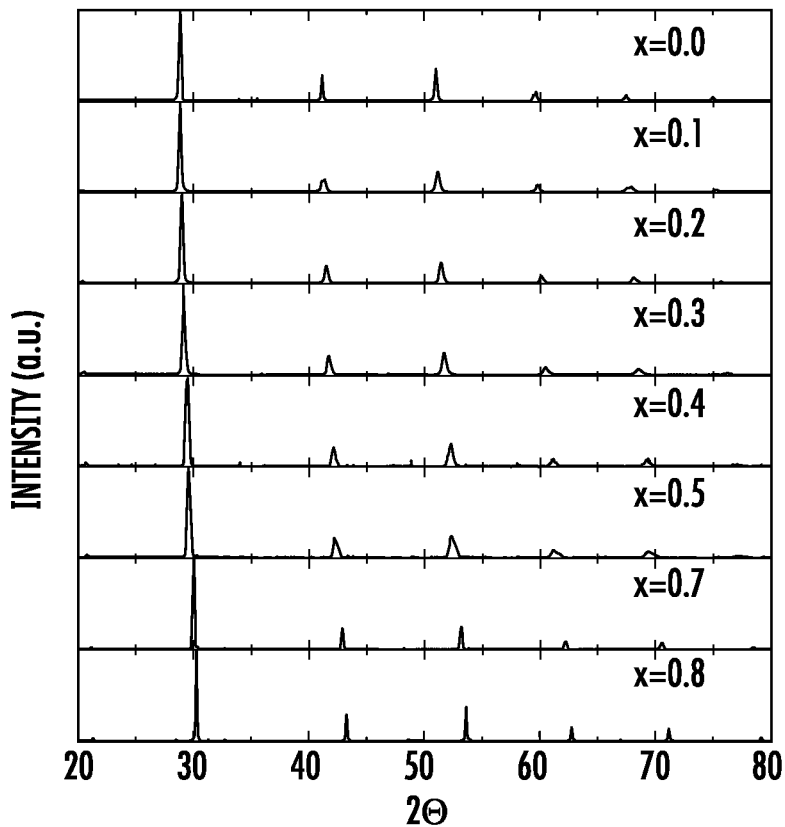
FIG. 1 represents different X-ray diffraction scans of $BaHf_xCe_{0.8-x}Y_{0.1}Yb_{0.1}O_3$ at different values of the index x.

The materials, compounds, compositions, articles, and methods described herein may be understood more readily by reference to the following detailed description of specific aspects of the disclosed subject matter and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

All percentages, ratios and proportions herein are by weight, unless otherwise specified. All temperatures are in degrees Celsius (° C.) unless otherwise specified.

The terms "a" and "an" are defined as one or more unless this disclosure explicitly requires otherwise.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Values expressed as "greater than" do not include the lower value. For example, when the "variable x" is defined as "greater than zero" expressed as "0<x" the value of x is any value, fractional or otherwise that is greater than zero.

Similarly, values expressed as "less than" do not include the upper value. For example, when the "variable x" is defined as "less than 2" expressed as "x<2" the value of x is any value, fractional or otherwise that is less than 2.

"Optional" or "optionally" means that the subsequently described event or circumstance can or cannot occur, and that the description includes instances where the event or circumstance occurs and instances where it does not.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

With the increased urgency to reduce carbon dioxide emissions, there is an ever increasing need to develop a wide range of mitigation technologies. Solid oxide fuel cells (SOFCs) have been commonly heralded as a transition technology due to their ability to operate efficiently on hydrocarbon fuels. Recent advances, however, have allowed SOFC technology not only to produce energy more efficiently but to also further contribute to carbon sequestration technology by producing value added chemicals through reverse operation, known as solid oxide electrolysis cells (SOECs). When combined with clean energy, high-temperature (>400° C.) SOECs allow for the production of several critical chemical species such as hydrogen, syn gas, and olefin in a more efficient and greener manner than the current method of conversion from natural gas or other fossil fuels.

One of the major challenges for SOECs is their stability. Proton conductors are the preferred choice for solid oxide electrolytes as they provide higher conductivity, and the highest performing electrolytes are based on $BaCeO_3$ which is quite susceptible to degradation by many of the common SOEC reactants and products including water and carbon dioxide. In fact, the current state-of-the-art proton conductor, $BaZr_{0.1}Ce_{0.7}Y_{0.1}Yb_{0.1}O_{3-\delta}$ (BZCYYb) degrades quickly under even mild $CO_2$ conditions. Not only does this prevent its use in SOECs, it limits its use in SOFCs with hydrocarbon fuels.

Without wishing to be limited by theory, in order to increase the electrolyte stability, the disclosed proton-conducting electrolytes have replaced the zirconium with hafnium. Hafnium is a prime candidate to improve stability for two major reasons. First, the reaction of $BaHfO_3$ with $CO_2$ and water has a higher Gibbs free energy than the corresponding reactions with $BaZrO_3$, which results in higher stability. Second, hafnium and zirconium have similar ionic radii, 85 pm and 86 pm respectively, making hafnium substitution unlikely to affect the structure as depicted in FIG. 1.

Figure 2A:
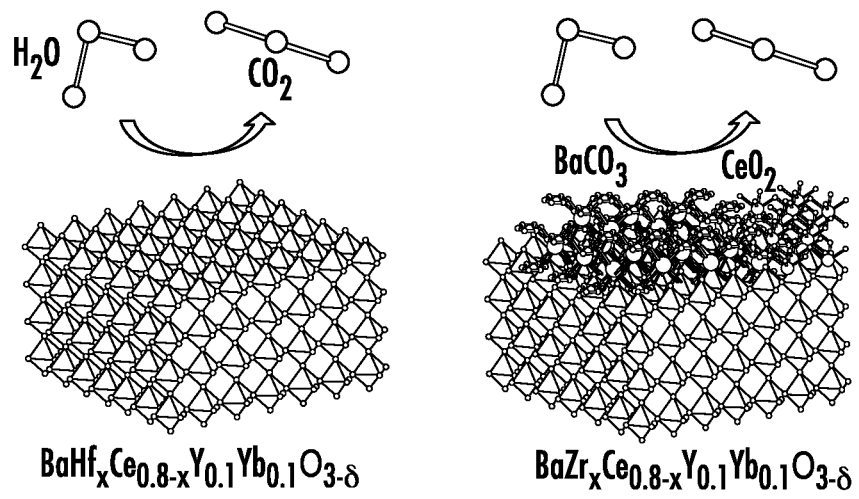
FIG. 2A is a schematic depicting the degradation reactions with $CO_2$ and $H_2O$ on $BaHf_xCe_{0.8-x}Y_{0.1}Yb_{0.1}O_3$ and $BaZr_xCe_{0.8-x}Y_{0.1}Yb_{0.1}O_3$.

Disclosed herein are barium hafnate comprising proton-conducting electrolytes having the formula:

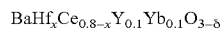

$$BaHf_xCe_{0.8-x}Y_{0.1}Yb_{0.1}O_{3-\delta}$$

wherein the index x is from about 0.1 to about 0.5 and wherein for convenience the disclosed barium-hafnates are also denoted as BHCYYb. As depicted in FIG. 2A BHCYYb has a higher stability than BZCYYb (zirconium analog) at similar dopant levels with similar or higher conductivity at low dopant levels.

Without wishing to be limited by theory, chemical stability is dictated by the Gibbs free energy of the degradation reaction:

$$BaMO_3 + CO_2 \rightarrow BaCO_3 + MO_2 \tag{1}$$

Figure 2B:
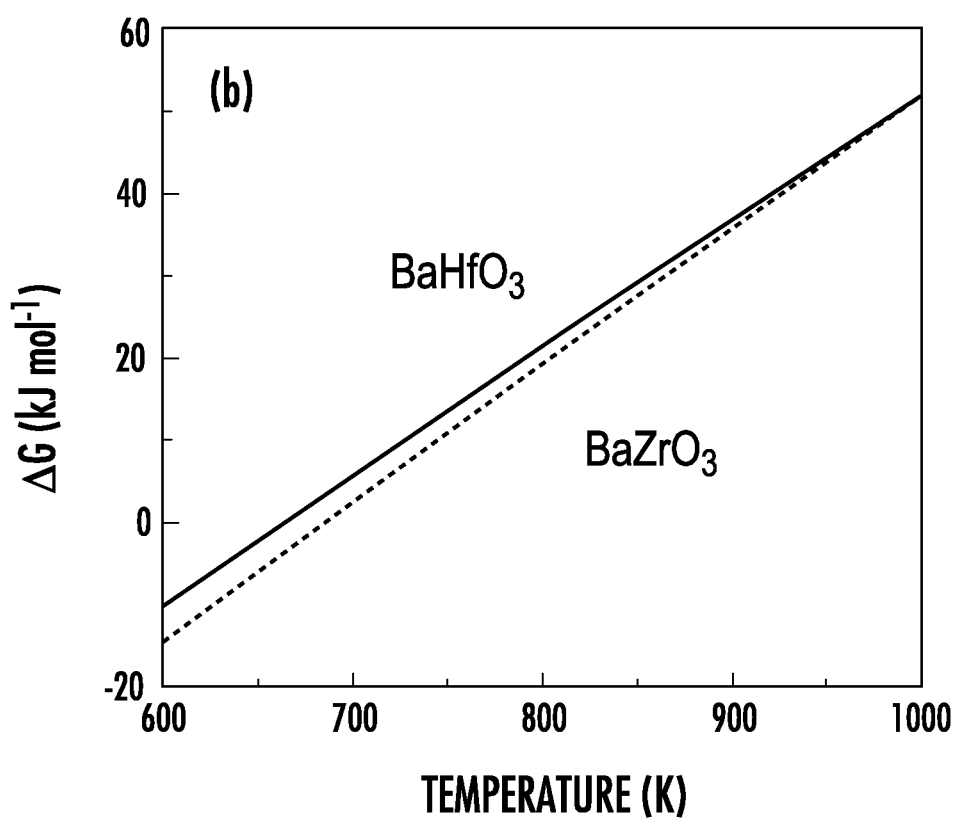
FIG. 2B shows the Gibbs free energy of the reaction between $BaMO_3$ and $CO_2$ to form $BaCO_3$ and $MO_2$ where M=Zr, Hf.
Figure 2C:
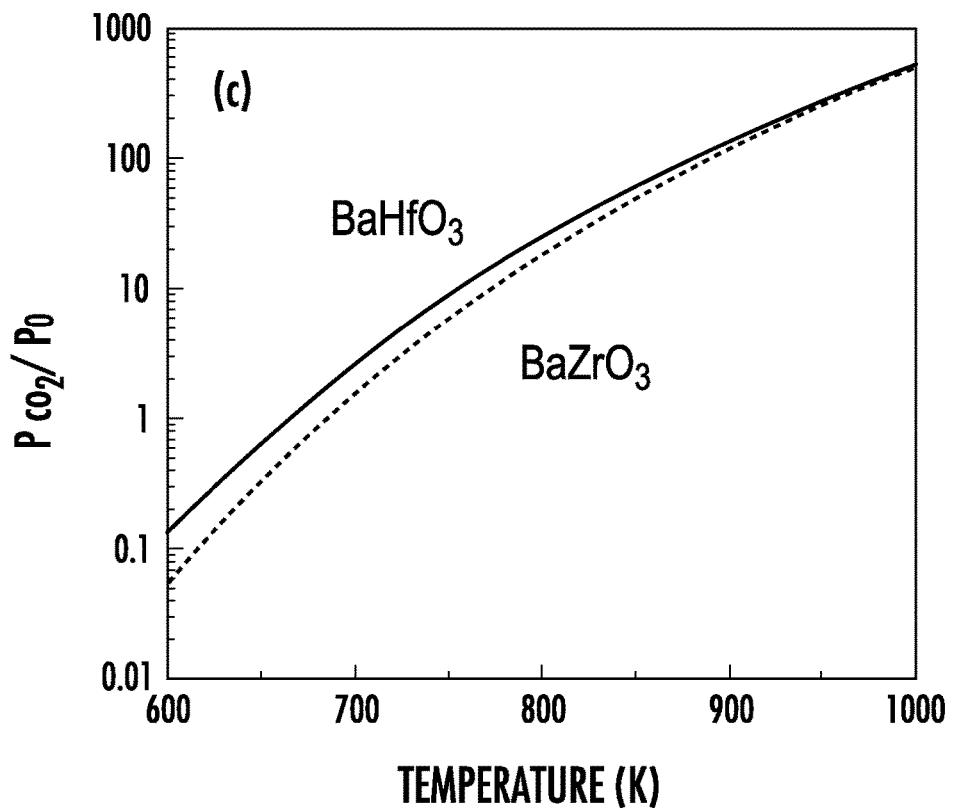
FIG. 2C shows the van't Hoff plot of the reaction between $BaMO_3$ and $CO_2$.

In order to provide an electrolyte with increased stability, the theoretical stability of the constituent perovskites was evaluated. The Gibbs free energy of reaction of $CO_2$ with $BaHfO_3$ is higher than that for $BaZrO_3$ as shown in FIG. 2B. This Gibbs free energy curve, when projected into Van't Hoff plot, demonstrates a larger stability window (or phase region) with respect to temperature and $CO_2$ partial pressure for $BaHfO_3$, as shown in FIG. 2C.

Figure 3:
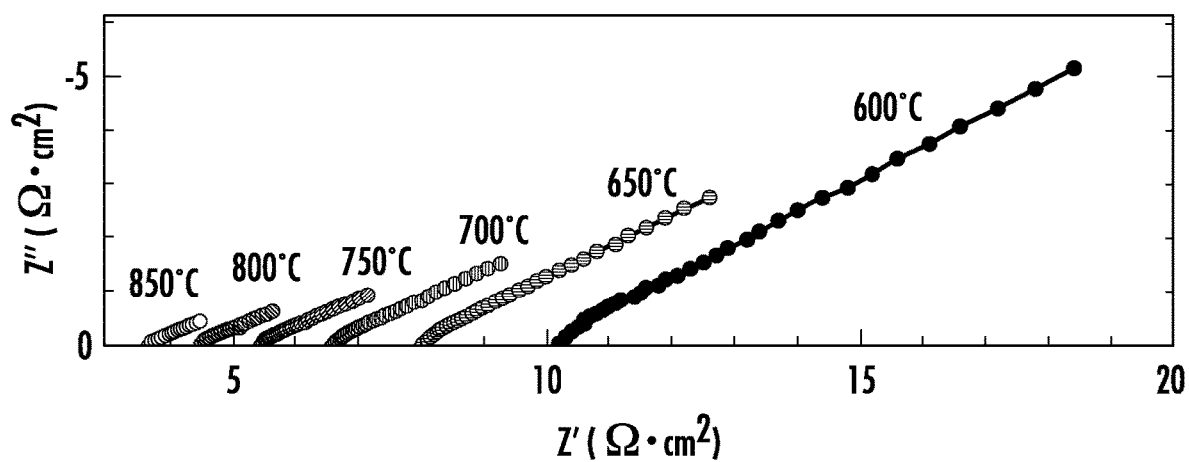
FIG. 3 depicts the Nyquist plots of the impedance spectroscopy of $BaHf_{0.1}Ce_{0.7}Y_{0.1}Yb_{0.1}O_{3-\delta}$ in 3% $H_2O$ in Ar.
Figure 4A:
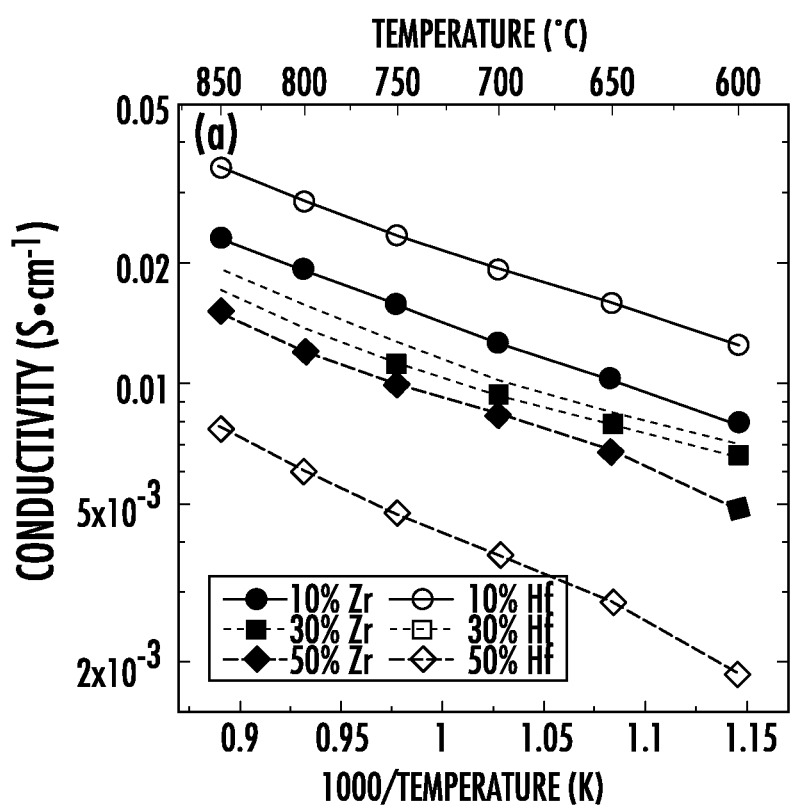
FIG. 4A-4B depict the conductivity of $BaZr_xCe_{0.8-x}Y_{0.1}Yb_{0.1}O_{3-\delta}$ and $BaHf_xCe_{0.8-x}Y_{0.1}Yb_{0.1}O_{3-\delta}$ as a function of (FIG. 4A) temperature and (FIG. 4B) concentration of Zr or Hf in an electrolyte.
Figure 4B:
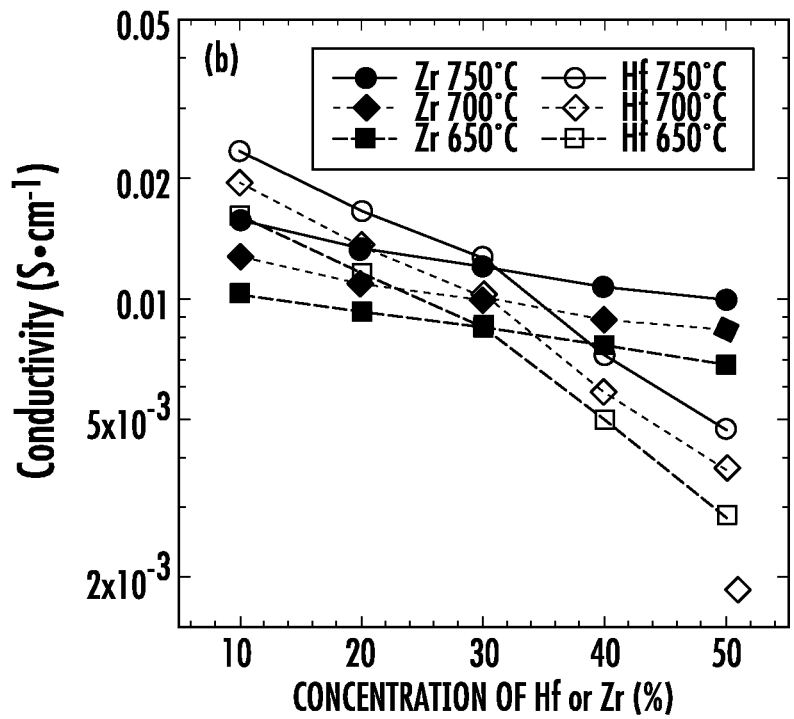

The conductivities of $BaHf_xCe_{0.8-x}Y_{0.1}Yb_{0.1}O_3$ (BHCYYb) and $BaZr_xCe_{0.8-x}Y_{0.1}Yb_{0.1}O_3$ (BZCYYb), wherein the index x is from about 0.1 to about 0.5, (samples are herein referred to by their abbreviation followed by the relative concentration of elements in the B-site. i.e. BaHf0.1Ce0.7Y0.1Yb0.1O3-δ is BHCYYb-1711) were measured in 3% $H_2O$ and argon using AC electrochemical impedance spectrometry (EIS) at temperatures ranging from 600-850° C. as depicted in FIG. 3. FIG. 4A FIG. 4B show the conductivities of both BHCYYb and BZCYYb. We can see that BHCYYb-1711 has almost 50% higher conductivity than BZCYYb-1711 across the entire temperature range. As Zr or Hf increases from 0.1 to 0.5, there is a consistent decrease in the conductivities for both BHCYYb and BZCYYb systems. However, BHCYYb has a much steeper decrease than that of BZCYYb. At X=0.3, both BHCYYb and BZCYYb have approximately the same conductivity and as Hf or Zr continues to increase above 0.3, the conductivity of BHCYYb drops below that of BZCYYb.

Figure 5A:
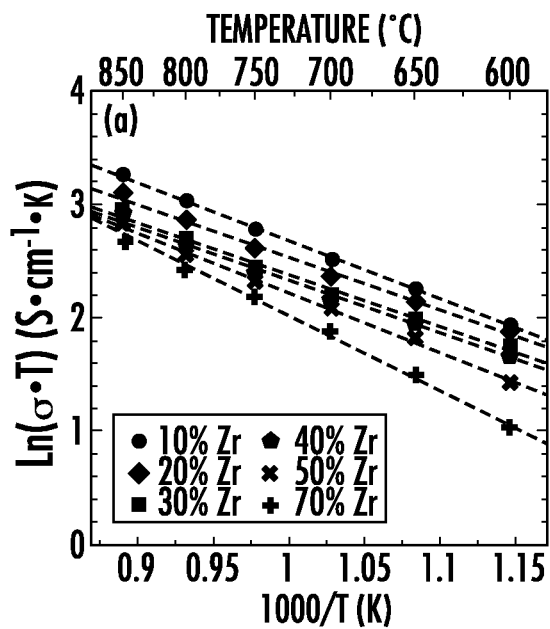
FIG. 5A depicts the Arrhenius plot of $BaZr_xCe_{0.8-x}Y_{0.1}Yb_{0.1}O_{3-\delta}$.
Figure 5B:
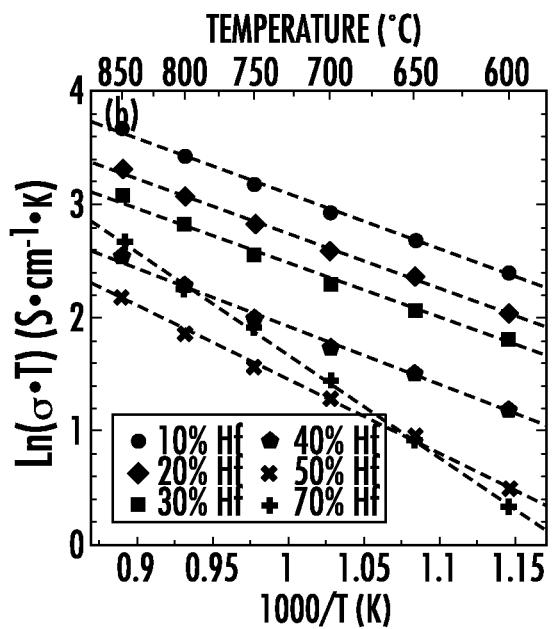
FIG. 5B depicts the Arrhenius plot of $BaHf_xCe_{0.8-x}Y_{0.1}Yb_{0.1}O_{3-\delta}$.

As shown in FIGS. 5A and 5B and as detailed in Table 1 below:

TABLE 1

| Compound | x = 0.1 | x = 0.2 | x = 0.3 | x = 0.4 | x = 0.5 | x = 0.7 |
|---|---|---|---|---|---|---|
| Ea of $BaHf_xCe_{0.8-x}Y_{0.1}Yb_{0.1}O_{3-\delta}$ (eV) | 0.41 | 0.41 | 0.43 | 0.44 | 0.55 | 0.76 |

TABLE 1-continued

| Compound | x = 0.1 | x = 0.2 | x = 0.3 | x = 0.4 | x = 0.5 | x = 0.7 |
|---|---|---|---|---|---|---|
| Ea of $BaZr_xCe_{0.8-x}Y_{0.1}Yb_{0.1}O_{3-\delta}$ (eV) | 0.44 | 0.40 | 0.40 | 0.41 | 0.45 | 0.55 |

When the index x=0.1-0.4, both BHCYYb and BZCYYb electrolytes have the similar activation energy (0.4-0.44 eV), indicating that the Hf concentration may have little effect on the ionic conduction mechanism of the electrolyte at X≤4. As seen herein, the Hf-based electrolytes, a larger activation energy (e.g., 0.76 eV for FIGS. 5A and 5B and Table 1). Without wishing to be limited by theory this can be attributed to two factors: (i) the motion of proton experiences more resistance and (ii) more oxide ions may contribute to ionic conduction in the electrolyte lattices with higher concentration of Hf, which incidentally have higher chemical stability.

Figure 6A:
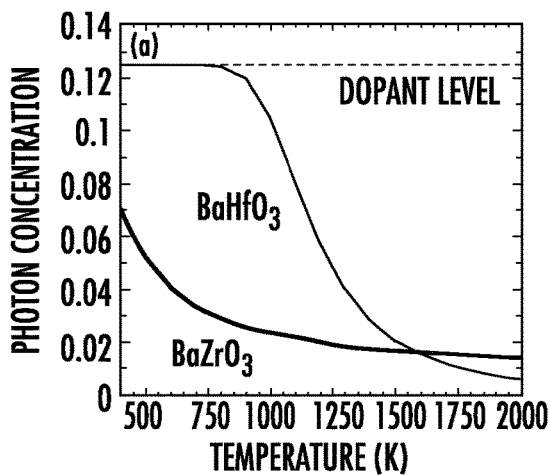
FIG. 6A depicts the proton concentration of $BaZrO_3$ and $BaHfO_3$.
Figure 6B:
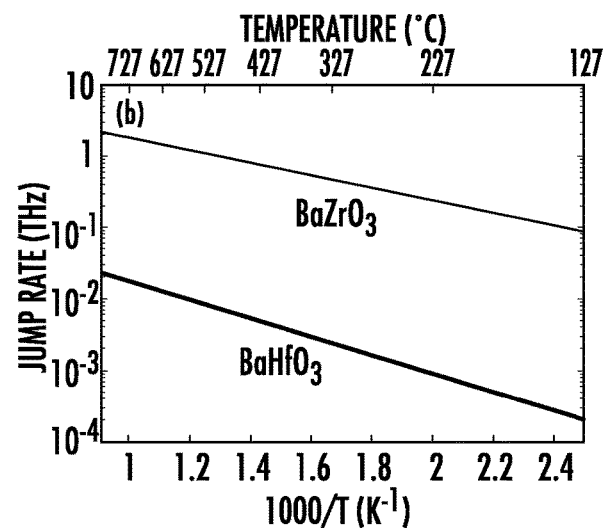
FIG. 6B depicts the proton jump rate of $BaZrO_3$ and $BaHfO_3$. Both

To understand the difference in conductivity between the two electrolytes, first-principles calculations were performed. For proton conduction, the proton concentration and proton jump rates dictate overall ionic conductivity. As such, the proton concentrations and proton jump rates for $BaZrO_3$ and $BaHfO_3$ were calculated. FIGS. 6A and 6B show that $BaHfO_3$ has a higher proton concentration but a slower proton jump rate than $BaZrO_3$ at SOFC operating temperatures. By comparing this with our experimental results, the difference in conductivity can begin to be understood. At low concentrations of Hf/Zr, the decrease in proton jump rate is minimal while the increase in proton concentration is substantial, which explains the higher conductivity of BHCYYB over BZCYYB at low dopant concentrations. However, when the concentration of Hf and Zr is increased, the decrease in proton jump rate dominates the conduction, explaining why BZCYYB has a greater conductivity than BHCYYB at high Hf/Zr concentrations.

Figure 7A:
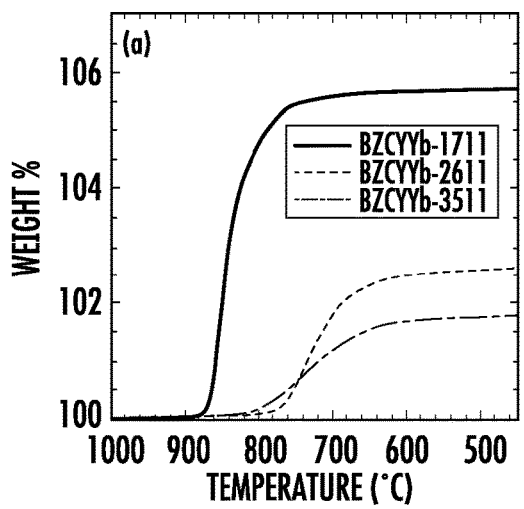
FIG. 7A represents the TGA profile of $BaZr_xCe_{0.8-x}Y_{0.1}Yb_{0.1}O_{3-\delta}$
Figure 7B:
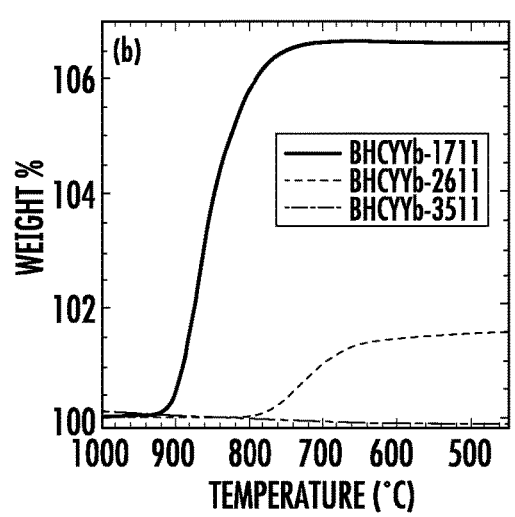
FIG. 7B represents to TGA profile of $BaHf_xCe_{0.8-x}Y_{0.1}Yb_{0.1}O_{3-\delta}$ when cooled in $CO_2$.
Figure 7C:
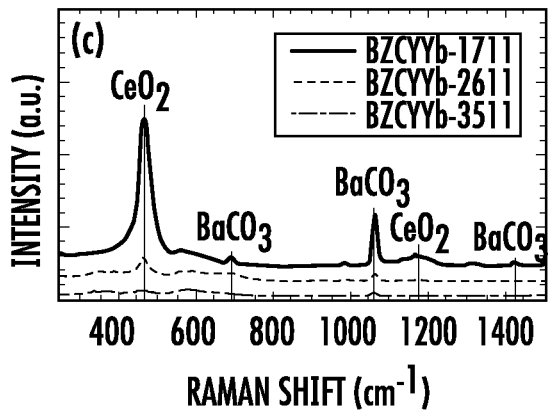
FIGS. 7C and 7D represent the Raman spectra of the powders after TGA analysis.
Figure 7D:
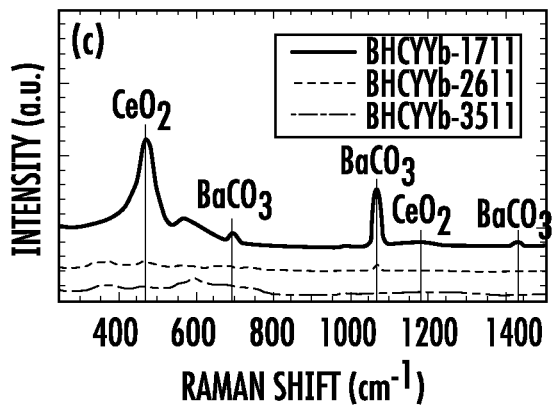
Figure 8:
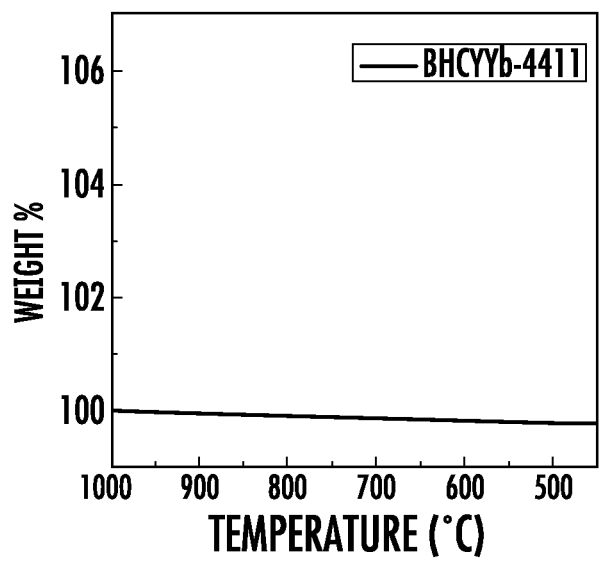
FIG. 8 is the TGA profile of $BaHf_{0.4}Ce_{0.4}Y_{0.1}Yb_{0.1}O_{3-\delta}$ cooled in $CO_2$.

Thermogravimetric analysis (TGA) was used to determine the minimal viable concentration of $CO_2$ to maintain stability and experimentally validate the increase in stability of BHCYYb over BZCYYb. Because $BaCeO_3$, $BaZrO_3$ and $BaHfO_3$ are all more reactive to $CO_2$ than to water, TGA measurements were carried out in pure $CO_2$. Moreover, all three materials are more stable at higher temperatures than at lower temperatures, so each sample was initially heated in argon to the starting temperature of 1000° C. Once the starting temperature was reached, the gas was switched to $CO_2$ and the materials were cooled at 1° C. per minute. The TGA profiles for X=0.1, 0.2, and 0.3 of BHCYYb and BZCYYb are shown in FIGS. 7A and 7B. When the hafnium or zirconium concentration increased, the temperature at which the degradation began decreased, starting at ~900° C. for x=0.1 and ~750° C. for x=0.2 for both BZCYYb and BHCYYb. However, at x=0.3 there is a significant distinction between the two material systems. BZCYYb still degrades, but BHCYYb does not. To determine the nature of the degradation, Raman spectra were taken of each sample after the TGA experiments were performed and are shown in FIGS. 7C and 7D. The Raman spectra of BHCYYb-1711 and BZCYYb-1711 showed prominent peaks at 694 cm$^{-1}$, 1059 cm$^{-1}$, and 1421 cm$^{-1}$ associated with the degradation phase of $BaCO_3$, and peaks at 470 cm$^{-1}$ and 1175 cm$^{-1}$ for $CeO_2$. For BZCYYb-2611 and BHCYYb-2611, $CeO_2$ and $BaCO_3$ could still be observed in the Raman spectra for both compounds. For BHCYYb-3511, no $CeO_2$ or $BaCO_3$ peaks could be detected but BZCYYb-3511 still had a $BaCO_3$ peak visible at 1060 cm$^{-1}$. In addition, a band at 583 cm$^{-1}$ appears for both BZCYYb and BHCYYb, which contains peaks associated with β-$Ba(OH)_2$. This peak has a greater intensity for BHCYYB than for BZCYYB, especially at low Hf concentrations which indicates a difference in hydration properties between the two compounds. The TGA measurement for BHCYYb-4411 was also carried out and no degradation was found as depicted in FIG. 8.

Figure 9:
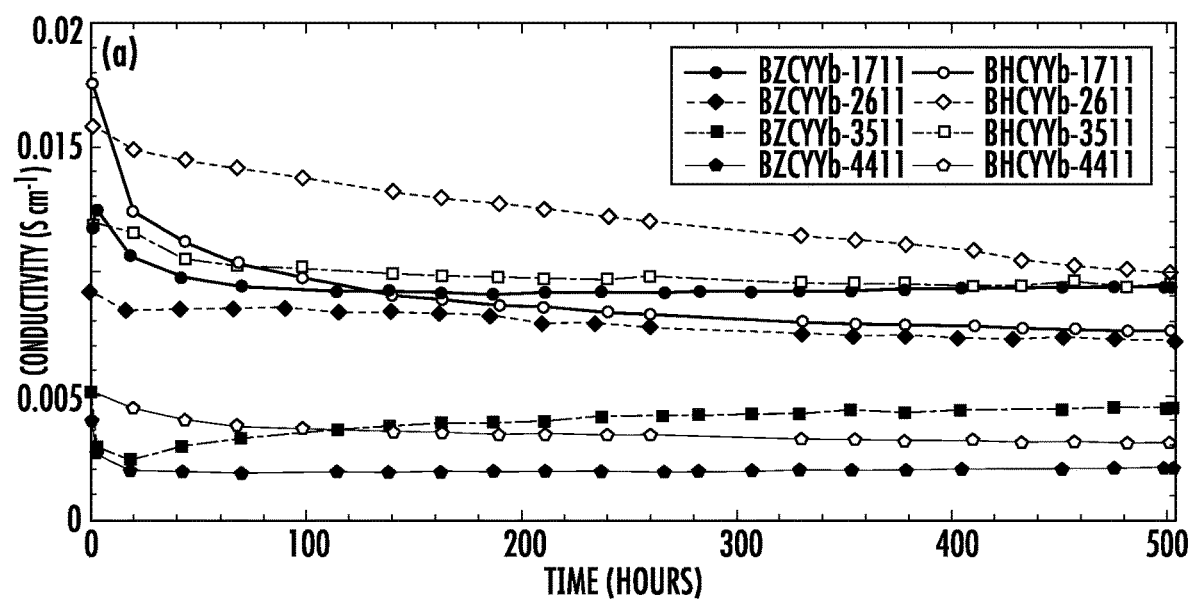
FIG. 9 discloses the conductivity of $BaZr_xCe_{0.8-x}Y_{0.1}Yb_{0.1}O_{3-\delta}$ and $BaHf_xCe_{0.8-x}Y_{0.1}Yb_{0.1}O_{3-\delta}$ over 500 hours in 25% $CO_2$, 25% $H_2O$, and 50% $H_2$ at 700° C.

While TGA measurements were performed under pure $CO_2$, the actual SOFC or SOEC operating conditions involve a gas mixture of $CO_2$, $H_2O$, and $H_2$. Therefore, to test the long-term stability of these materials under standard SOFC/SOEC operating conditions, the long-term conductivity was measured in 25% $CO_2$, 25% $H_2O$, and 50% $H_2$ for 500 hours at 700° C. The conductivity trends are shown in FIG. 9. The results show that both BHCYYb-1711 and BZCYYb-1711 quickly degrade over the first 100 hours, then slowly continue to degrade throughout the remaining 400 hours. For BZCYYb-2611 and BHCYYb-2611, there is no initial rapid degradation, but the degradation instead proceeds slowly over the 500 hours. Finally, for BHCYYb-3511, there is little to no degradation in the conductivity throughout the entire test. These results are consistent with the TGA results. While BHCYYb-4411 does exhibit good long-term stability, its conductivity is much lower than BHCYYb-3511 over the entire 500 hours.

Figure 10A:
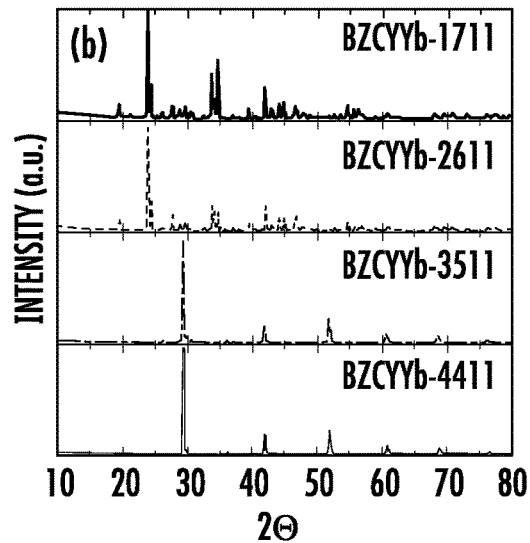
FIG. 10A discloses the XRD patterns of $BaZr_xCe_{0.8-x}Y_{0.1}Yb_{0.1}O_{3-\delta}$ after exposure to 25% $CO_2$, 25% $H_2O$, and 50% $H_2$ at 700° C. for 500 hours.
Figure 10B:
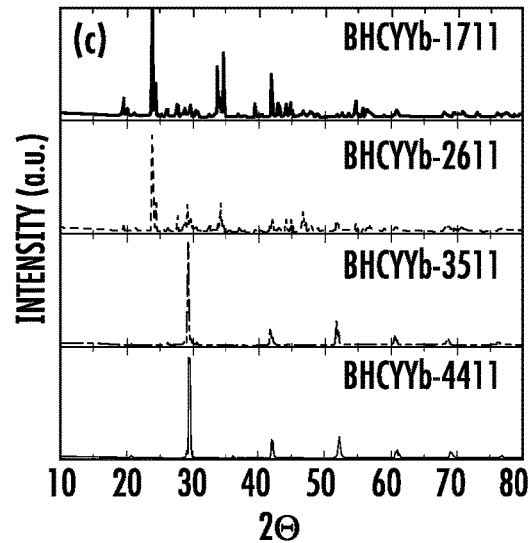
FIG. 10B discloses the XRD patterns of $BaHf_xCe_{0.8-x}Y_{0.1}Yb_{0.1}O_{3-\delta}$ after exposure to 25% $CO_2$, 25% $H_2O$, and 50% $H_2$ at 700° C. for 500 hours.

While Raman spectroscopy is useful for characterizing localized degradation confined to the surface of a material, X-ray diffraction (XRD) has a larger overall sampling volume and was used in conjunction with Raman to further characterize the degradation, shown in FIGS. 10A and 10B. The degradation phases were identified as $BaCO_3$ and $CeO_2$, consistent with the Raman results above. To determine the relative extent of the degradation, the XRD spectra was refined in the Panalytical Highscore Plus software to determine the volume percent of each phase present. Those results, shown in Table 2 herein below, show that there was less degradation in the BHCYYb samples compared to the equivalent BZCYYb samples.

TABLE 2

| Concentration of Hf | % Degradation | Concentration of Zr | % Degradation |
|---|---|---|---|
| Hf = 0.1 | 100% | Zr = 0.1 | 99.9% |
| Hf = 0.2 | 80.1% | Zr = 0.2 | 93.5% |
| Hf = 0.3 | 7.6% | Zr = 0.3 | 9.9% |
| Hf = 0.4 | 1.1% | Zr = 0.4 | 0.2% |

Figure 11A:
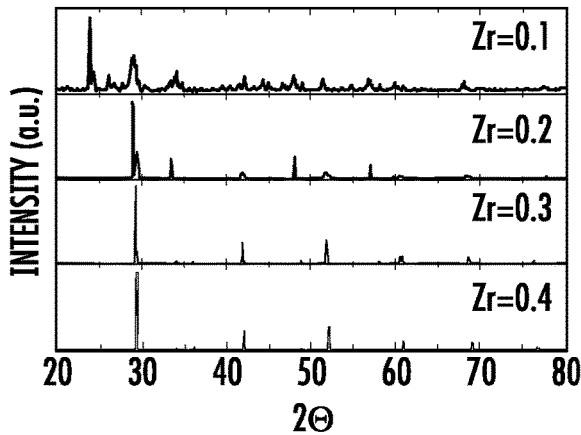
FIG. 11A depicts the XRD pattern of $BaZr_xCe_{0.8-x}Y_{0.1}Yb_{0.1}O_3$
Figure 11B:
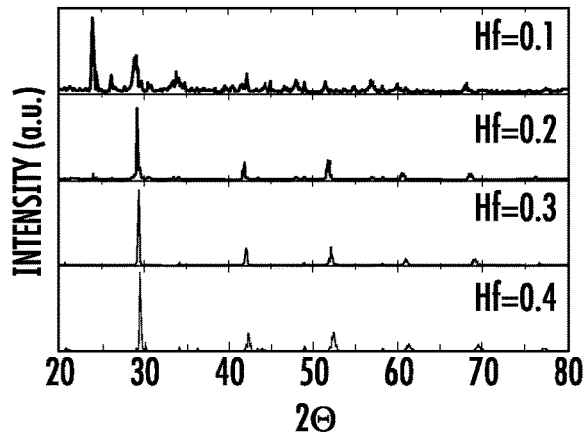
FIG. 11B depicts the XRD pattern of $BaHf_xCe_{0.8-x}Y_{0.1}Yb_{0.1}O_3$ electrolytes after 500 hr in 25% $CO_2$ & 75% Ar at 700° C.
Figure 12A:
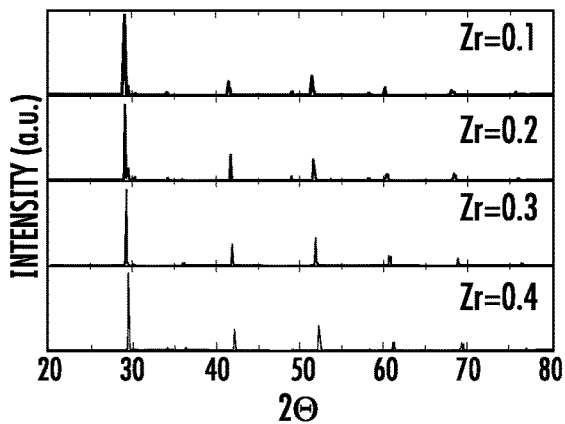
FIG. 12A depicts the XRD patterns of $BaZr_xCe_{0.8-x}Y_{0.1}Yb_{0.1}O_3$
Figure 12B:
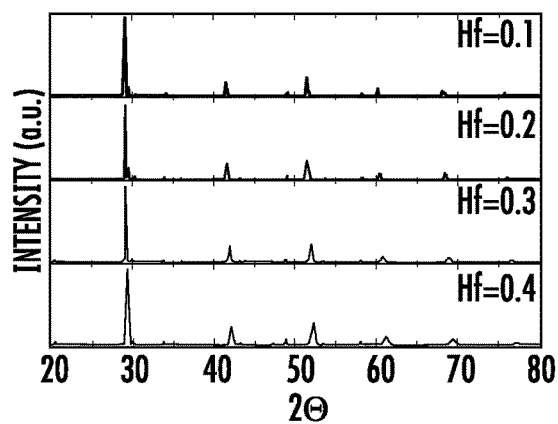
FIG. 12B depicts the XRD pattern of $BaHf_xCe_{0.8-x}Y_{0.1}Yb_{0.1}O_3$ electrolytes after 500 hr in 25% $H_2O$ & 75% Ar at 700° C.
Figure 13A:
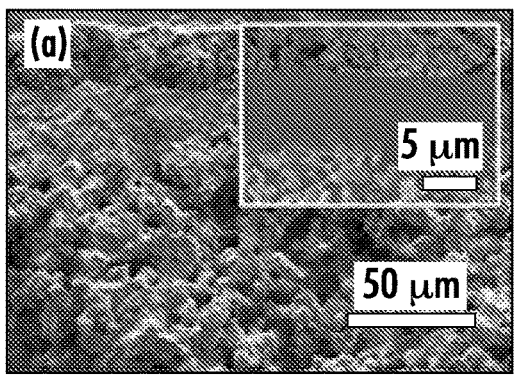
FIG. 13A is a micrograph of the cross-sectional SEM images of the single cell with the configuration of "Ni-BHCYYb (3511)/BHCYYb (3511)/PBSCF".
Figure 13B:
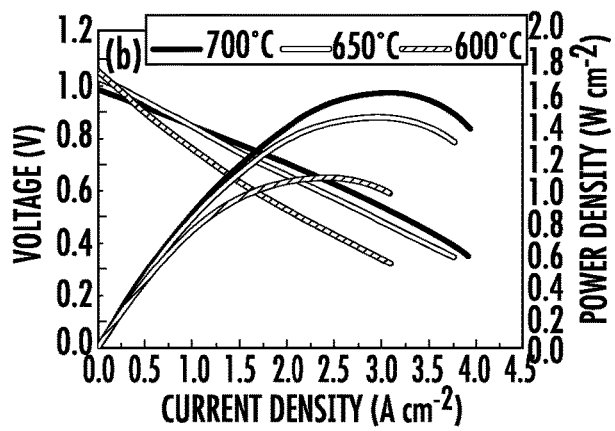
FIG. 13B is the I-V-P curves of the single cell operated at 600-700° C. using $H_2$ as the fuel and ambient air as the oxidant.
Figure 13C:
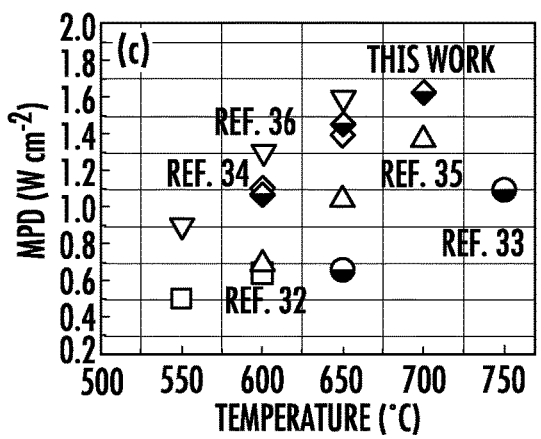
FIG. 13C is the comparison of MPDs of SOFCs based on proton conductors.

From XRD analysis, the only degradation phases present were $BaCO_3$ and $CeO_3$. Since Raman showed the formation of possibly β-$Ba(OH)_2$, the role of $H_2O$ in the degradation mechanism needs to be studied. To further uncover the degradation mechanism, the materials were exposed to 25% $CO_2$ in Ar and 25% $H_2O$ in Ar at 700° C. for 500 hours and analyzed with XRD, shown in FIG. 11A and FIG. 11B, respectively. There was no phase change observed when exposed to 25% $H_2O$, giving evidence that water does not significantly contribute the overall material degradation (FIGS. 12A and 12B). When exposed to 25% $CO_2$ in argon (FIG. 11A and FIG. 11B), there was less degradation compared to the 25% $CO_2$, 25% $H_2O$, and 50% $H_2$ (FIGS. 10A and 10B). These results suggest that a chemical interaction between $CO_2$ and the $H_2O$ or $H_2$ accelerates the degradation more than the individual gases alone.[31] Furthermore, we see that BHCYYb exhibits higher stability than BZCYYb in all cases, reinforcing the fact that BHCYYb is more stable against the various potential degradation conditions in fuel cell operation. As shown in the long-term conductivity tests of the electrolytes under realistic fuel cell conditions, the composition of $BaHf_{0.3}Ce_{0.5}Y_{0.1}Yb_{0.1}O_3$ (BHCYYb-3511) is the minimum required hafnium composition in order to maintain stability in aggressive SOFC conditions. As such, this composition was used in a Ni-BHCYYb/BHCYYb/ $PrBa_{0.5}Sr_{0.5}Co_{1.5}Fe_{0.5}O_{5+\delta}$ (PBSCF) full cell to evaluate its performance and stability as a fuel cell electrolyte, shown in FIGS. 13A-13I. A dense electrolyte with the thickness of around 10 μm was observed (FIG. 13A). The open circuit voltages (OCVs) of the cell are 1.04, 1.01, and 0.98 V at 600, 650, and 700° C., respectively and the maximum power densities (MPDs) are 1.1, 1.4, and 1.6 W $cm^{-2}$ at 600, 650, and 700° C., respectively, as shown in FIG. 13B. When compared to the MPD's reported in the literature (See, C. Duan et al., *Science* 2015, 349, 1321; L. Yang et al., *Science* (80). 2009, 326, 126; S. Choi et al., *Nat. Energy* 2018, 3, 202; J. Kim et al., *Chem Sus Chem* 2014, 7, 2811; and) H. An et al., *Nat. Energy* 2018, 3, 870) (FIG. 13C), the performance is commensurate with those reported for other SOFC's based on proton conductors.

Figure 13D:
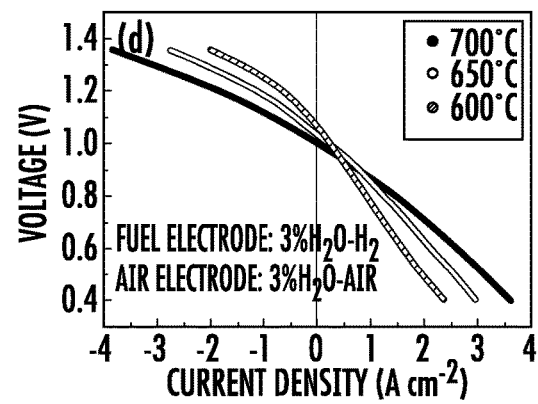
FIG. 13D represents the current-voltage curves of the single cell under both electrolysis and fuel cell modes.
Figure 13E:
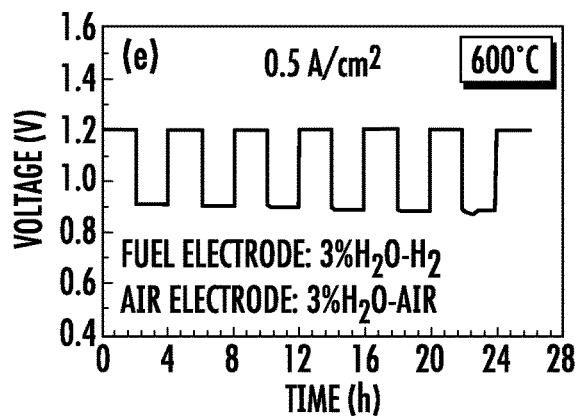
FIG. 13E represents the continuous cyclic operation between electrolysis and fuel cell mode at 600° C.
Figure 13F:
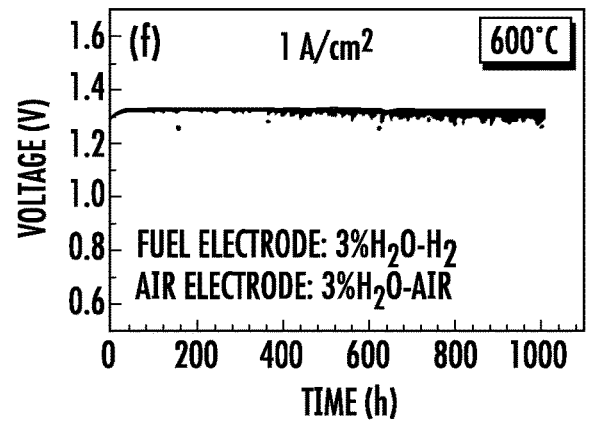
FIG. 13F represents the long-term stability of the electrolysis cell at 600° C. and 1 A $cm^{-2}$.

In addition to fuel cell tests, BHCYYb-3511 was also tested as an electrolyte for both steam and $CO_2$—$H_2O$ co-electrolysis. FIG. 13D shows the current-voltage curves of the cell when humidified hydrogen (with 3% $H_2O$) was used as the fuel and humidified (3% $H_2O$) air as the oxidant. High round-trip efficiencies (calculated by dividing the voltage in fuel cell mode by the voltage in electrolysis mode) of 78%, 72%, and 62% at 1 A $cm^{-2}$ are achieved at 700, 650, and 600° C. respectively. At 600° C., a current density of 1.45 A $cm^{-2}$ at a cell voltage of 1.3 V represents one of the highest performances ever reported (See, J. Kim et al., *Nano Energy* 2018, 44, 121; C. Duan et al., *Nat. Energy* 2019, 4, 230; S. Choi et al., *Energy Environ. Sci.* 2019, 12, 206; and L. Lei et al., *Adv. Funct. Mater.* 2019, 1903805). The reversibility of the cell was evaluated at 600° C. by cyclic operation between the fuel cell mode and the electrolysis mode at a current density of 0.5 A $cm^{-2}$ for 2 hours each (FIG. 13E). As shown in FIG. 13F, an excellent long-term stability of the cell in electrolysis mode was demonstrated with no obvious degradation at a current density of 1 A $cm^{-2}$ at 600° C. for 1000 hours.

Figure 13G:
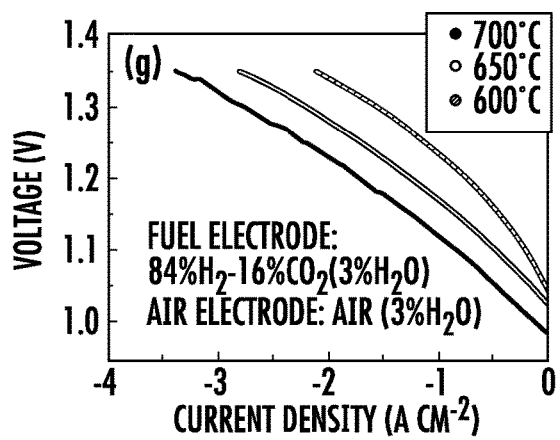
FIG. 13 G represents the current-voltage curves of a BHCYYb-3511/PBSCF single cell under the electrolysis mode with $CO_2$ in the fuel side.
FIG. 13I depicts the cross-sectional SEM image of the BHCYYb-3511 electrolysis cell shown in FIG. 13H after operation for 700 hours.
Figure 13H:
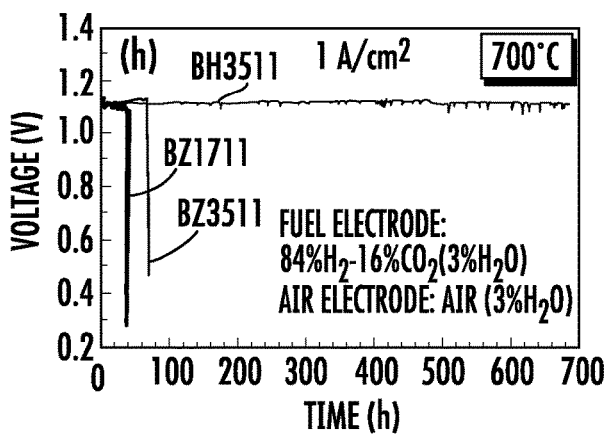
Figure 13I:
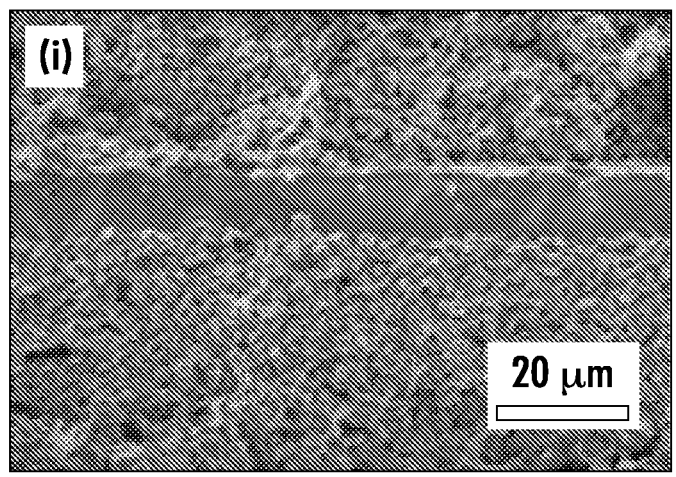

In addition to steam electrolysis, the cell was also tested for $CO_2$—$H_2O$ co-electrolysis to evaluate the stability of the BHCYYb electrolytes against $CO_2$. FIG. 13G shows the current-voltage curves of the cell with humidified (3% $H_2O$) mixture of 16% $CO_2$ and 84% $H_2$ on the fuel side and humidified (3% $H_2O$) air on the other side. Similar performance of the electrolysis cell was achieved under the atmosphere of $CO_2$ (FIG. 13G) in comparison to that using pure $H_2$ for electrolysis (FIG. 13D). The long-term stability of the BHCYYb-3511 cell for $CO_2$—$H_2O$ co-electrolysis is shown in FIG. 13H), together with those of the cells based on BZCYYb-1711 and BZCYYb-3511 electrolyte. The BHCYYb-3511 cell is stable throughout the 700 hours test while both the BZCYYb-1711 and BZCYYb-3511 cells quickly degrades within 70 hours. The degradation reflected in FIG. 13H is the rapid voltage dip, which should be attributed to the decomposition of electrolytes under the $CO_2$ containing atmosphere. The durability results shown in FIG. 13H reinforces the fact that BHCYYb electrolytes are more stable against $CO_2$ and $H_2O$ than BZCYYb electrolytes. Cross-sectional scanning electron microscopy (SEM) image of the BHCYYb-3511 cell after the 700 hours-durability test is shown in FIG. 13I, revealing a dense electrolyte membrane and good boding between the electrolyte and the porous electrodes.

EXAMPLES

Preparation $BaHf_xCe_{0.8-x}Y_{0.1}Yb_{0.1}O_3$ (BHCYYb) and $BaZr_xCe_{0.8-x}Y_{0.1}Yb_{0.1}O_3$ (BZCYYB) powders were synthesized using a solid-state reaction process (See, L. Yang et al., *Science* (80). 2009, 326, 126). Appropriate mole ratios of $BaCO_3$, $HfO_2$ or $ZrO_2$, $CeO_2$, $Y_2O_3$, and $Yb_2O_3$ were well mixed, pressed into large pucks and fired to 1100° C. for 12 hours. The resulting powder was high energy ball-milled at 850 RPM for 4 cycles of 5 minutes each, with 10-minute breaks between each cycle. The ball-milled powder was again pressed into large pucks and fired to 1100° C. for 10 hours, followed by 1450° C. for 5 hours. Finally, the powder was high energy ball-milled at 850 RPM for 6 cycles of 5 minutes each, with 10-minute breaks between each cycle. 1 wt % NiO was added as a sintering aid. Dense pellets were achieved by pressing powder at 590 MPa into a 13 mm die. The green pellets were then fired at 1450° C. for 5 hours.

Characterization

To determine ionic conductivity, silver electrodes were affixed to the samples with silver paste (Fuel Cell Materials) and fired to 800° C. for 2 hours. The conductivity was measured using an EG&G 263A potentiostat and a Solartron SI1255 frequency response analyzer. TGA measurements were taken on a TA Instruments SDT Q600 in a $CO_2$ atmosphere with a cooling rate of 1° C./min. X-ray diffraction measurements were taken on a Panalytical X'Pert Pro Alpha-1 using CuKα1 radiation and a XCelerator detector in the range of 20-80 2θ with a step size of 0.013 °2θ and an effective time per step of 68.6 s. Refinement was carried out using Panalytical HighScore Plus software. The cross-sectional microstructure and morphology of full cells were examined using a scanning electron microscope (SEM, Hitachi SU8010).

Raman measurements were taken with a Renishaw RM1000 spectromicroscopy system using an Ar-gas laser (Mellos Griot) with a wavelength of 514 nm and a laser power of 12 mW. The beam was focused using an Olympus LMPlanFI 50×/NA0.75 objective. The beam was focused to a diameter of 2 μm spot size. A slit size of 20 μm was used to minimize any peak distortion while maximizing signal. The WiRE™ software by Renishaw was used to set an acquisition time of 30 s per scan with an accumulation number of 3 scans. Spectra were smoothed using the Savitzky-Golay method with 50 points of window and a 5th order polynomial.

Fuel Cell Fabrication and Testing

Half cells with the configuration of Ni-BHCYYb/ BZCYYb anode supporting layer, Ni-BHCYYb/BZCYYb anode functional layer, and BHCYYb/BZCYYb electrolyte layer were fabricated by the co-tape casting and co-sintering techniques. Specifically, the BHCYYb/BZCYYb electrolyte powder and the mixture of BHCYYb/BZCYYb and NiO powder (NiO:electrolyte powder=6:4 by weight) were mixed in solvent to form their respective slurries. The slurries for tape casting were ethanol based and contained dispersing agent, binder, plasticizer and other additives, in addition to powder. The electrolyte layer was cast onto the Mylar film first. After drying, the anode functional layer was cast on top of the electrolyte layer, followed by the anode supporting layer. The tri-layer tape was then dried and co-sintered at 1400° C. for 5 hours in air. A $PrBa_{0.5}Sr_{0.5}Co_{1.5}Fe_{0.5}O_{5+\delta}$ (PBSCF) cathode with an effective area of 0.28 $cm^2$ was prepared by screen printing the mixture of PBSCF powder and terpineol (5 wt % ethyl cellulose) onto the electrolyte layer and fired at 950° C. for 2 hours in air. The PBSCF powder was synthesized by a combustion method. Stoichiometric amounts of $Pr(NO_3)_3 \cdot 6H_2O$, $Ba(NO_3)_2$, $Sr(NO_3)_2$, $Co(NO_3)_2 \cdot 6H_2O$, and $Fe(NO_3)_3 \cdot 6H_2O$ were dissolved in distilled water with proper amount of ethylene glycol and anhydrous citric acid (1:1 ratio). The solutions were heated up to 350° C. in air and followed by combustion to form fine powders. The resulting powders were then ground and calcined again at 900° C. for 2 hours. The button cells were mounted on an alumina supporting tube using Ceramabond 552 (Aremco) as sealant for electrochemical performance testing. The flow rate of the humidified $H_2$ (3% $H_2O$) supplied to the fuel electrode was 20 sccm and the air electrode was exposed to ambient air (the oxidant). For the water electrolysis test, the flow rate of the humidified (3% $H_2O$) $H_2$ and the humidified (3% $H_2O$) air was 50 sccm and 100 sccm, respectively. For the $H_2O$—$CO_2$ co-electrolysis test, a humidified (3% $H_2O$) gas mixture of 84% $H_2$ and 16% $CO_2$ was supplied to the fuel electrode at a flow rate of 50 sccm. The cell performance was monitored using an Arbin multi-channel electrochemical testing system (MSTAT).

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A proton-conducting electrolyte having the formula:

$$BaHf_xCe_{0.8-x}Y_{0.1}Yb_{0.1}O_{3-\delta}$$

wherein the index x is from about 0.1 to about 0.5.

2. The electrolyte according to claim 1, chosen from $BaHf_{0.1}Ce_{0.7}Y_{0.1}Yb_{0.1}O_3$, $BaHf_{0.2}Ce_{0.6}Y_{0.1}Yb_{0.1}O_3$, $BaHf_{0.3}Ce_{0.5}Y_{0.1}Yb_{0.1}O_3$, $BaHf_{0.4}Ce_{0.4}Y_{0.1}Yb_{0.1}O_3$, or $BaHf_{0.5}Ce_{0.3}Y_{0.1}Yb_{0.1}O_3$.

3. A solid state fuel cell comprising a barium hafnium proton-conducting electrolyte having the formula:

$$BaHf_xCe_{0.8-x}Y_{0.1}Yb_{0.1}O_{3-\delta}$$

wherein the index x is from about 0.1 to about 0.5.

4. The electrolyte according to claim 3, chosen from $BaHf_{0.1}Ce_{0.7}Y_{0.1}Yb_{0.1}O_3$, $BaHf_{0.2}Ce_{0.6}Y_{0.1}Yb_{0.1}O_3$, $BaHf_{0.3}Ce_{0.5}Y_{0.1}Yb_{0.1}O_3$, $BaHf_{0.4}Ce_{0.4}Y_{0.1}Yb_{0.1}O_3$, or $BaHf_{0.5}Ce_{0.3}Y_{0.1}Yb_{0.1}O_3$.

* * * * *